United States Patent [19]
Zicker et al.

[11] Patent Number: 6,122,523
[45] Date of Patent: *Sep. 19, 2000

[54] CELLULAR RADIOTELEPHONE SYSTEM WITH REMOTELY PROGRAMMED MOBILE STATIONS

[75] Inventors: Robert G. Zicker; John K. Dion, both of Roswell, Ga.

[73] Assignee: GTE Mobile Communications Service Corporation, Alpharetta, Ga.

[*] Notice: This patent is subject to a terminal disclaimer.

[21] Appl. No.: 09/363,901

[22] Filed: Jul. 28, 1999

Related U.S. Application Data

[63] Continuation of application No. 09/124,268, Jul. 29, 1998, which is a continuation of application No. 09/020,324, Feb. 6, 1998, Pat. No. 5,878,339, which is a continuation of application No. 08/315,010, Sep. 29, 1994, abandoned, which is a continuation-in-part of application No. 08/201,445, Feb. 24, 1994, Pat. No. 5,594,782.

[51] Int. Cl.[7] ........................................... H04B 1/38
[52] U.S. Cl. .................... 455/551; 455/419; 455/552; 455/426
[58] Field of Search ................... 455/418–420, 455/403, 422, 550–552, 426, 434, 461–462

[56] References Cited

U.S. PATENT DOCUMENTS

| | | | |
|---|---|---|---|
| 4,593,155 | 6/1986 | Hawkins | 455/411 |
| 4,817,190 | 3/1989 | Comroe et al. | 455/11.1 |
| 4,864,599 | 9/1989 | Saegusa et al. | 455/411 |
| 4,910,510 | 3/1990 | Davis et al. | 340/825.44 |
| 4,958,368 | 9/1990 | Parker | 379/91.01 |
| 5,020,091 | 5/1991 | Krolopp et al. | 455/551 |
| 5,046,082 | 9/1991 | Zicker et al. | 455/419 |
| 5,109,403 | 4/1992 | Sutphin | 455/419 |
| 5,179,373 | 1/1993 | John | 340/825.15 |
| 5,212,809 | 5/1993 | Oka | 455/177 |
| 5,239,294 | 8/1993 | Flanders et al. | 340/825.34 |
| 5,297,191 | 3/1994 | Gerszberg | 455/419 |
| 5,297,192 | 3/1994 | Gerszberg | 455/419 |
| 5,301,223 | 4/1994 | Amadon et al. | 455/409 |
| 5,381,138 | 1/1995 | Stair et al. | 340/825.44 |
| 5,386,455 | 1/1995 | Cooper | 455/419 |
| 5,442,809 | 8/1995 | Diaz et al. | 455/511 |
| 5,483,465 | 1/1996 | Grube et al. | 340/825.44 |
| 5,485,505 | 1/1996 | Norman et al. | 455/419 |
| 5,544,225 | 8/1996 | Kennedy, III et al. | 455/412 |
| 5,594,782 | 1/1997 | Zicker et al. | 455/417 |
| 5,603,084 | 2/1997 | Henry, Jr. et al. | 455/419 |
| 5,613,214 | 3/1997 | Shirasawa et al. | 455/411 |
| 5,668,875 | 9/1997 | Brown et al. | 380/248 |
| 5,722,084 | 2/1998 | Chakrin et al. | 455/551 |
| 5,754,954 | 5/1998 | Cannon et al. | 455/419 |
| 6,029,065 | 2/2000 | Shah | 455/414 |
| 6,029,066 | 2/2000 | Despres et al. | 455/419 |

FOREIGN PATENT DOCUMENTS

| | | | |
|---|---|---|---|
| 0 478 231 A2 | 1/1992 | European Pat. Off. | H04Q 7/04 |
| 0630167A2 | 12/1994 | European Pat. Off. | |
| 2 249 459 | 6/1992 | United Kingdom | H04Q 7/04 |
| 2249459 | 6/1992 | United Kingdom | |
| WO 95/10921 | 4/1995 | WIPO | |

OTHER PUBLICATIONS

"Mobile Station—Land Station Compatibility Specification", Electroni Industries Association, Sep. 1989.

*Primary Examiner*—William G. Trost
*Attorney, Agent, or Firm*—Leonard Charles Suchyta

[57] ABSTRACT

A cellular radiotelephone system (10) includes mobile stations (28) which may be remotely programmed from a customer activation system (12) to effect activation and other programming needs. Mobile stations (28) are manufactured in a blank form that causes them to operate only in an inactive state. During activation, information describing the mobile station's electronic serial number (ESN) is collected along with area of use information. A mobile identification number (MIN) is assigned in response to the area of use information. A page message is directed to the mobile station operating in its inactive state, but the page message references the mobile station's ESN. While inactive, the mobile station (28) detects pages directed to its ESN. A remote programming session is then performed wherein digital user-specific programming data, including the newly assigned MIN, are transferred to the mobile station (28) over a voice channel using a control channel protocol (80).

60 Claims, 7 Drawing Sheets

| F = 1 | NAWC | T | S | E | RSVD = 0 | S C M | MIN1 23-0 | P |
|---|---|---|---|---|---|---|---|---|
| 1 | 3 | 1 | 1 | 1 | 1 | 4 | 24 | 12 |

| F = 0 | NAWC | LOCAL | ORDQ | ORDER | LT | RSVD = 000...0 | MIN2 33-24 | P |
|---|---|---|---|---|---|---|---|---|
| 1 | 3 | 5 | 3 | 5 | 1 | 10 | 10 | 12 |

| F = 0 | NAWC | SERIAL | P |
|---|---|---|---|
| 1 | 3 | 32 | 12 |

| DOTTING | WORD SYNC | REPEAT 1 OF WORD A | REPEAT 1 OF WORD B | REPEAT 2 OF WORD A | ... |
|---|---|---|---|---|---|
| 11 | 12 | 44 | 44 | 44 | |

| ... | REPEAT 4 OF WORD B | REPEAT 5 OF WORD A | REPEAT 5 OF WORD B | DOTTING | ... |
|---|---|---|---|---|---|
| | 44 | 44 | 44 | 44 | |

DOTTING = 1010101010
WORD SYNC = 11100010010

| $T_1T_2$ | DOC | MIN1 23-0 | P |
|---|---|---|---|
| 1 | 2 | 24 | 12 |

| $T_1T_2$ = 10 | SOC= 11 | MIN2 33-24 | RSVD =0 | LOCAL | ORDQ | ORDER | P |
|---|---|---|---|---|---|---|---|
| | SOC≠ 11 | | | | | | |
| 2 | 2 | 10 | 1 | 5 | 3 | 5 | 12 |

| DOTTING | W.S. | REPEAT 1 OF WORD | DOT. | W.S. | REPEAT 2 OF WORD | ... |
|---|---|---|---|---|---|---|
| 101 | 11 | 40 | 37 | 11 | 40 | |

| ... | DOT. | W.S. | REPEAT 9 OF WORD | DOT. | W.S. | REPEAT 10 OF WORD | DOT. | W.S. | REPEAT 11 OF WORD |
|---|---|---|---|---|---|---|---|---|---|
| | 37 | 11 | 40 | 37 | 11 | 40 | 37 | 11 | 40 |

DOTTING = 1010....101
WORD SYNC = 11100010010        152

FIG. 9

CELLULAR RADIOTELEPHONE SYSTEM WITH REMOTELY PROGRAMMED MOBILE STATIONS

RELATED APPLICATIONS

The present patent application is a Continuation of "Cellular Radiotelephone System With Remotely Programmed Mobile Stations," by Robert G. Zicker, et al., Ser. No. 09/124,268, filed Jul. 29, 1998; which is a Continuation of "Cellular Radiotelephone System With Remotely Programmed Mobile Stations," by Robert G. Zicker, et al., Ser. No. 09/020,324, filed Feb. 6, 1998, issued Mar. 2, 1999 as U.S. Pat. No. 5,878,339; which is a Continuation of "Cellular Radiotelephone System With Remotely Programmed Mobile Stations," by Robert G. Zicker, et al., Ser. No. 08/315,010, filed Sep. 29, 1994, now abandoned; which is a Continuation-In-Part of "Multiple Mode Personal Wireless Communications System," by Robert G. Zicker, et al., Ser. No. 08/201,445, filed Feb. 24, 1994, issued Jan. 14, 1997 as U.S. Pat. No. 5,594,782; all of which are incorporated herein by reference.

TECHNICAL FIELD OF THE INVENTION

The present invention relates generally to cellular radio telecommunication systems. More specifically, the present invention relates to the control of user-specific programming stored in and acted upon by mobile stations.

BACKGROUND OF THE INVENTION

Mobile stations used in connection with conventional cellular telecommunication systems are manufactured in a blank or unprogrammed state. An activation process is performed both to acquire customer identification information so that customers may be successfully billed for communication services and to personalize the mobile stations so that they will be capable of providing communication services. Until a mobile station has been activated, it can neither make nor receive a call. After activation, changes in either customer preferences or system operating characteristics can require changes to the mobile stations' personalization.

Personalization is accomplished by causing the mobile station to include certain user-specific programming. The user-specific programming represents data which cause the mobile station to function as desired for a specific user. Examples of user-specific programming include, but are not limited to, a mobile identification number (MIN) and home system identification (SID). The MIN represents the mobile station's phone number, and the home SID represents the identification of the cellular system with which the user has contracted to provide communication services.

Activation is currently accomplished through two different techniques. In accordance with one activation technique, a skilled service representative collects data from a new customer, uses a computer in data communication with an on-line computerized customer activation system to obtain a valid MIN, and manually operates the mobile station's keypad to program the MIN and other user-specific programming in the mobile station. In accordance the second technique, preprogrammed mobile stations are stocked in retail stores so that no user-specific programming need be keyed into the mobile station keypad. Both techniques have undesirable consequences.

The technique of requiring a skilled service representative to program mobile stations forces new customers to go out of their way to visit a service representative. This is an inconvenience to customers and limits the availability of mobile stations in mass markets. Moreover, this technique is error prone because the human factor is involved in hand-keying user-specific programming into mobile stations. It is also expensive because of labor costs associated with making a sufficient number of skilled service representatives available to the general public. In addition, the expense and error-prone nature of this technique are exacerbated because the programming sequences are typically cryptic, different mobile station manufacturers use different programming sequences, and the programming sequences change as new mobile station models become available.

The second technique of stocking preprogrammed mobile stations addresses some of the problems associated with using skilled service representatives to hand-key user-specific programming into mobile stations. However, this second technique increases activation costs due to the need to inventory and track mobile stations that differ only in their user-specific programming. In addition, user-specific programming is typically configured to fit general customer profiles rather than an individual customer's preferences. It also leads to confusion in the assignment of MINs. For example, MINs are assigned well in advance of when the mobile station is actually sold. The MIN is allocated for a particular area or location of use, typically at the location of the retail store where the mobile station is sold. However, the customer may seldom or never actually use the mobile station near the store. Consequently, the customer may get a mobile station with a MIN which is not appropriate for the customer's actual area of use.

The problems associated with the above two techniques for activating mobile stations could, in large part, be eliminated through the use of a remotely programmable mobile station. While a few remotely programmable mobile stations have been devised, they cannot be remotely programmed for activation. Conventional remotely programmable mobile stations require the mobile station to be activated before they may be remotely programmed. Prior activation is required because the mobile stations accomplish remote programming by making or receiving a call, but they can neither make nor receive a call until after activation. In addition, conventional remotely programmable mobile stations use ubiquitous telecommunications modem technology to receive the user-specific data. A security risk results due to the coupling of mobile stations to a public network and the widespread availability of modem technology in the general population.

SUMMARY OF THE INVENTION

Accordingly, it is an advantage of the present invention that an improved cellular system having remotely programmed mobile stations is provided.

Another advantage of the present invention is that mobile stations may be remotely programmed for user-specific activation programming and for subsequent alterations in the user-specific programming.

Another advantage is that the present invention provides remote programming without requiring the use of ubiquitous conventional telecommunications modem technology.

Another advantage is that the present invention provides for the secure remote programming of certain mobile stations without requiring significant changes to the existing cellular telecommunications infrastructure.

The above and other advantages of the present invention are carried out in one form by a method of operating a cellular telecommunications system to manage user-specific programming stored in mobile stations, to manage signalling between one or more land stations and the mobile stations, and to manage the transfer of user information to and from the mobile stations. The method calls for communicating between a land station and a mobile station using one of either a digital data mode or an analog audio mode. The land station is operated in cooperation with the mobile station so that the digital data mode is used to communicate both signalling and the user-specific programming. In addition, the land station is operated in cooperation with the mobile station so that the analog audio mode is used to communicate the user information.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a data format diagram of a three word page response message sent over a reverse control channel;

FIG. 5 shows a data stream protocol diagram of a control channel protocol;

FIG. 7 shows a data format diagram of a two word mobile station control message sent over a forward control channel;

FIG. 9 shows a data stream protocol diagram of a voice channel protocol; and

DETAILED DESCRIPTION OF THE PREFERRED EMBODIMENTS

Figure 1:
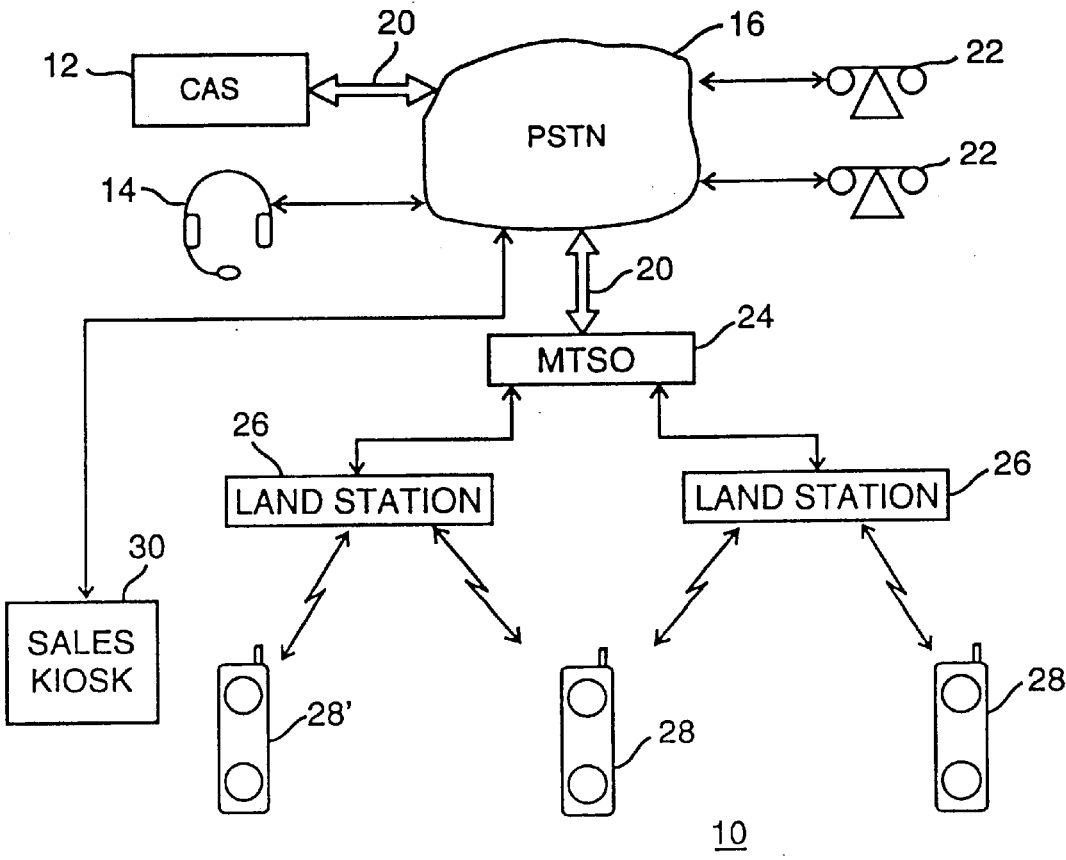
FIG. 1 shows a telecommunications system which may incorporate the present invention.

FIG. 1 shows a block diagram of a telecommunications system 10 which may incorporate the present invention. Telecommunications system 10 includes a customer activation system (CAS) 12 with any number of service representative operator stations 14 located nearby. CAS 12 is implemented using a conventional computer system. Operator stations 14 couple to a public switched telecommunications network (PSTN) 16 or other communications network through a conventional local loop so that a service representative may engage in telephonic voice conversations with customers and prospective customers. CAS 12 couples to a trunk 20 supplied through PSTN 16. Any number of additional telecommunications devices 22 may also couple to PSTN 16 to engage in the communication of audio, video, data, or other user information.

PSTN 16 desirably extends trunk 20 to a mobile telecommunications switching office (MTSO) 24. For the most part, MTSO 24 has a conventional structure and performs processes which are conventional in the art of cellular telephony, and more particularly in accordance with conventional cellular telephony standards established for the United States of America and other countries, as set forth in Standard EIA-553 and elsewhere. MTSO 24 couples to any number of land stations 26, which likewise have generally conventional structures and generally perform conventional processes. However, processes performed by MTSO 24 and land stations 26 diverge from conventional processes in the manner set forth below. Land stations 26 may represent cell sites, base stations, and the like, which may manage radio communications over control channels and/or voice channels so that mobile stations 28 may receive telecommunications services. However, land stations 26 are not limited to use only as a cell site but may also be used for a personal or private communications system. In addition, while the "land station" terminology is consistent with the conventional cellular telephony lexicon, land stations are not limited to being coupled to land lines and may couple to MTSO 24 or other controlling stations through RF links.

Mobile stations 28 may communicate user information through the voice channels to other mobile stations 28, telecommunications devices 22, or even operator station 14. Generally, mobile stations 28 are intended to be used while in motion or during halts at unspecified points. However, mobile stations 28 include hand-held units, vehicle-mounted units, portable units, and units which are physically configured for use only at permanent stationary locations.

User information is communicated when a call is setup and a land station 26 and mobile station 28 operate in an analog audio mode to communicate analog audio signals. Consequently, voice communications are directly translated into electronic user information, and digital data may be translated into electronic user information through the use of modems (not shown) which translate digital data into analog audio signals.

Likewise, mobile stations 28 may transmit and receive digital signalling data. Signalling data are generally communicated to allocate and otherwise manage the channels over which communications are to take place and to indicate a desire to engage in transmitting user information over the voice channels. Generally, signalling data are transparent to users. Signalling data are communicated when a land station 26 and mobile station 28 operate in a digital data mode to communicate digital data. In the preferred embodiment, digital signalling data are communicated using a 10 Kbit, Manchester encoded, FSK digital communication scheme in which is well known in the cellular telephony art.

In accordance with the present invention, user-specific programming is communicated between CAS 12 and mobile stations 28. User-specific programming generally represents digital data and/or executable instructions which personalize or otherwise configure a mobile station 28 so that it may be used to communicate user information and otherwise provide communication services in a manner desired by a customer. Examples of typical user-specific programming include a mobile identification number (MIN), home system identification (SID), "A" or "B" system selection criteria, feature package identification, local area dialing rules, and the like. In addition, user-specific programming may include programming instructions which are executed by a microprocessor within mobile station 28 to cause mobile station 28 to function in any particular manner. Further, for purposes of the present invention, user-specific programming also includes an instruction which, when executed by a mobile station 28, deactivates the mobile station 28 so that it cannot be used to communicate user information. User-specific programming is communicated when a land station 26 and mobile station 28 operate in a digital data mode to communicate digital data using the 10 Kbit communication scheme that conventional cellular telephony devices are designed to accommodate. Thus, no extra modems are required to communicate user-specific programming, the expense of the extra modems may be eliminated, and the security risk of being vulnerable to unwanted programming through ubiquitous modem technology available throughout the world is avoided.

Mobile stations 28 may be remotely programmed even to effect their own activation. Desirably, mobile stations 28 are manufactured, distributed, stocked, and sold in a blank, unpersonalized form where they are configured to operate only in an inactive mode. Mobile stations 28 may include certain default user-specific programming which may make mobile station 28 usable, although not necessarily as desired by certain customers.

However, inactive mobile stations 28 do not include a valid MIN. Those skilled in the art will appreciate that a MIN represents a telephone number assigned to a mobile station 28. The MIN is desirably assigned based upon the customer's area of use for the mobile station 28. For example, area codes and central office codes need to correspond to the locations where the mobile station 28 is most likely to be used so that the mobile station 28 will not be roaming and otherwise get assessed with excessive fees for the majority of calls and so that incoming calls may be successfully routed to the mobile station 28. Thus, a valid MIN is assigned in the course of activating a mobile station 28, and this MIN is a location-dependent code consistent with an area code and central office code corresponding to the areas where mobile station 28 will most likely be used. PSTN 16 uses the MIN in routing calls to particular MTSOs 24, and cellular systems use MINs to route calls to and from specific mobile stations 28.

While an inactive mobile station 28 does not have a MIN or at least a valid MIN, it does have an electronic serial number (ESN). The ESN uniquely identifies the mobile station 28 to any cellular system and is configured so that it may not be readily changed. The ESN is assigned in accordance with a manufacturer's code and another code which is unique to the manufacturer. The ESN does not designate any area of use and is therefore a location-independent code which conveys no information useful to PSTN 16 in routing calls to the mobile station 28 to which it is assigned.

FIG. 1 shows a sales kiosk 30 which may be used in the activation of a mobile station 28'. Sales kiosk 30 and CAS 12 are typically remotely located from one another, and may in some situations be located thousands of miles away from one another. Desirably, sales kiosk 30 may be located in a retail store where mobile stations 28 are sold to mass markets, and any number of sales kiosks 30 may be supported by CAS 12.

Sales kiosk 30 represents a telecommunications device which couples to PSTN 16 through a local loop. When a customer wishes to purchase mobile station 28', the customer may physically take mobile station 28' to sales kiosk 30 and use sales kiosk 30 to engage in a voice conversation through PSTN 16 with a service representative at a station 14. Through this voice conversation, the service representative may collect user activation information from the customer and enter this information into CAS 12. Such information includes the identifying data which permits a cellular service provider to successfully bill for communication services. It also includes the ESN for mobile station 28', which a customer may, for example, recite from reading a tag affixed to mobile station 28'. In addition, the activation information includes location data which inform the service representative where mobile station 28' is most likely to be used. This information may be inferred from the customer's address and the address of sales kiosk 30, and/or directly obtained from a conversation with the customer. Through the voice conversation, the customer may select preferred feature packages and the like.

When the activation information has been gathered, and preferably while the voice conversation is ongoing, CAS 12 automatically causes an "activation call" to be placed to mobile station 28'. The appropriate MTSO 24 to use for this call is selected by CAS 12 in response to an address of the sales kiosk 30 where mobile station 28' is currently located. Processes which are discussed below are performed in CAS 12, MTSO 24, land stations 26, and mobile station 28' so that mobile station 28' will recognize and respond to the call by using a paging message which references the mobile station's ESN. Once a data link is established, a remote programming session is performed where user-specific programming, including a newly assigned MIN, is transferred to mobile station 28' and stored therein. At the conclusion of the remote programming session, mobile station 28' may be used to communicate user information.

Figure 2:
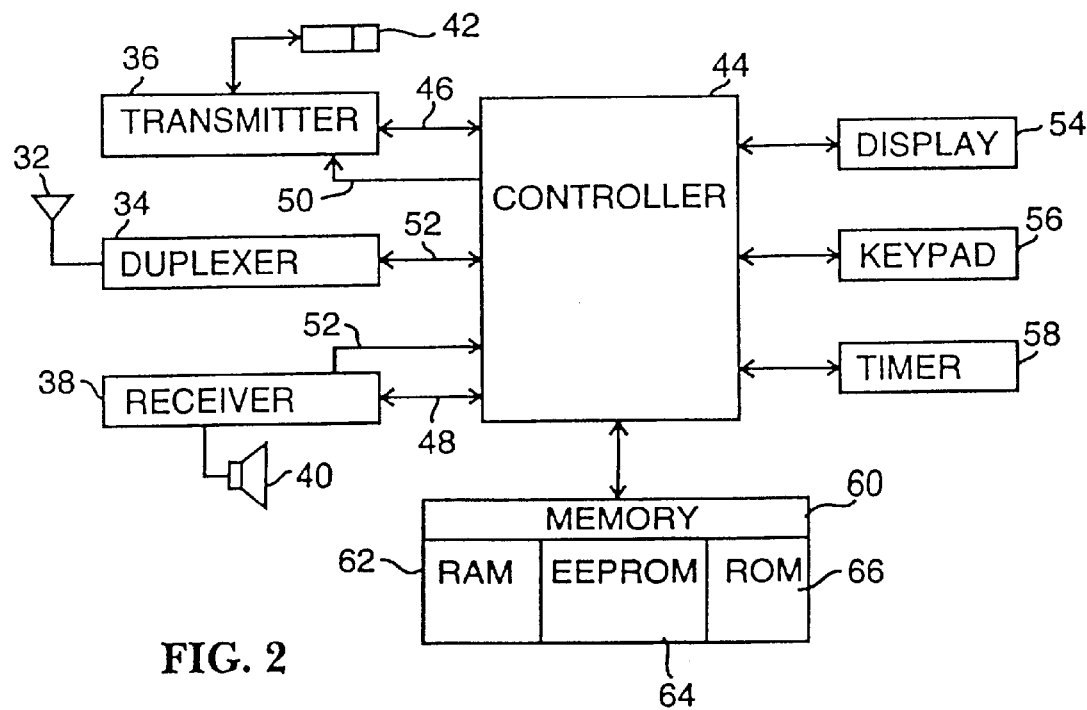
FIG. 2 shows a block diagram of a mobile station configured in accordance with the present invention.

FIG. 2 shows a block diagram of electronic hardware included in a mobile station 28 which is configured in accordance with the requirements of system 10. An antenna 32 of mobile station 28 couples to a first port of a duplexer 34, while a second port of duplexer 34 is adapted to receive a modulated RF signal provided by a transmitter 36 and a third port of duplexer 34 provides a received RF signal to an input of a receiver 38. An audio output from receiver 38 couples to a speaker 40, and an audio input to transmitter 36 couples to a microphone 42. Transmitter 36 receives analog audio signals from microphone 42 and receiver 38 provides analog audio signals to speaker 40 when mobile station 28 operates in its analog audio mode. Although not shown, a modem may couple to or otherwise be switched into these analog audio paths so that digital data converted into an analog audio form may be communicated in a conventional manner while mobile station 28 operates in its analog audio mode.

A controller 44 controls the operation of mobile station 28. Controller 44 may be implemented using one or more commercially available microprocessors. Controller 44 provides controlling signals to transmitter 36 and to receiver 38 over data lines 46 and 48, respectively. In addition, controller 44 provides digital data to a digital data input 50 of transmitter 36 for transmission while mobile station 28 operates in its digital data mode and receives digital data from a digital data output 52 of receiver 38 while mobile station 28 operates in its digital data mode. In the preferred embodiment, the controlling signals applied over data lines 46 and 48 identify frequency channels to which transmitter 36 and receiver 38 are instructed to tune, and they specify whether transmitter and receiver 36 and 38, respectively, are to operate in the analog audio mode or digital data mode.

A display 54 couples to controller 44 and visually shows information provided thereto by controller 44. A keypad 56 couples to controller 44 so that controller 44 may detect key presses and then appropriately respond to the key presses. A timer 58 couples to controller 44 and helps controller 44 monitor the passage of time. In addition, a memory 60 couples to controller 44. Memory 60 stores data, variables, tables, lists, and databases that are used in connection with the operation of mobile station 28. In addition, memory 60 stores programming instructions which are executed by controller 44 and define the various processes, procedures, routines, tasks, and the like performed by controller 44 and mobile station 28. In the preferred embodiments, memory 60 is partitioned into three components. A random access memory (RAM) component 62 represents volatile read/write memory. An electrically erasable programmable read only memory (EEPROM) component 64 provides non-volatile read/write memory, and a read only memory (ROM) component 66 represents non-volatile, read only memory which cannot be easily erased or otherwise altered. Those skilled in the art will appreciate that ROM component 66 may be implemented using PROMS, EPROMS, and the like.

Desirably, default user-specific programming is stored both in ROM 66 and EEPROM 64 when mobile station 28 is manufactured and sold to a customer. This default user-specific programming includes an invalid MIN and an invalid home SID, along with a factory setting for a keypad lock code and an index to a predetermined default features package. Due at least in part to the use of an invalid MIN, mobile station 28 cannot engage in calls which communicate user information at this point. ROM 66 also stores the location-independent ESN for mobile station 28 and data identifying all control channels used by "A" and "B" cellular systems.

Figure 3:
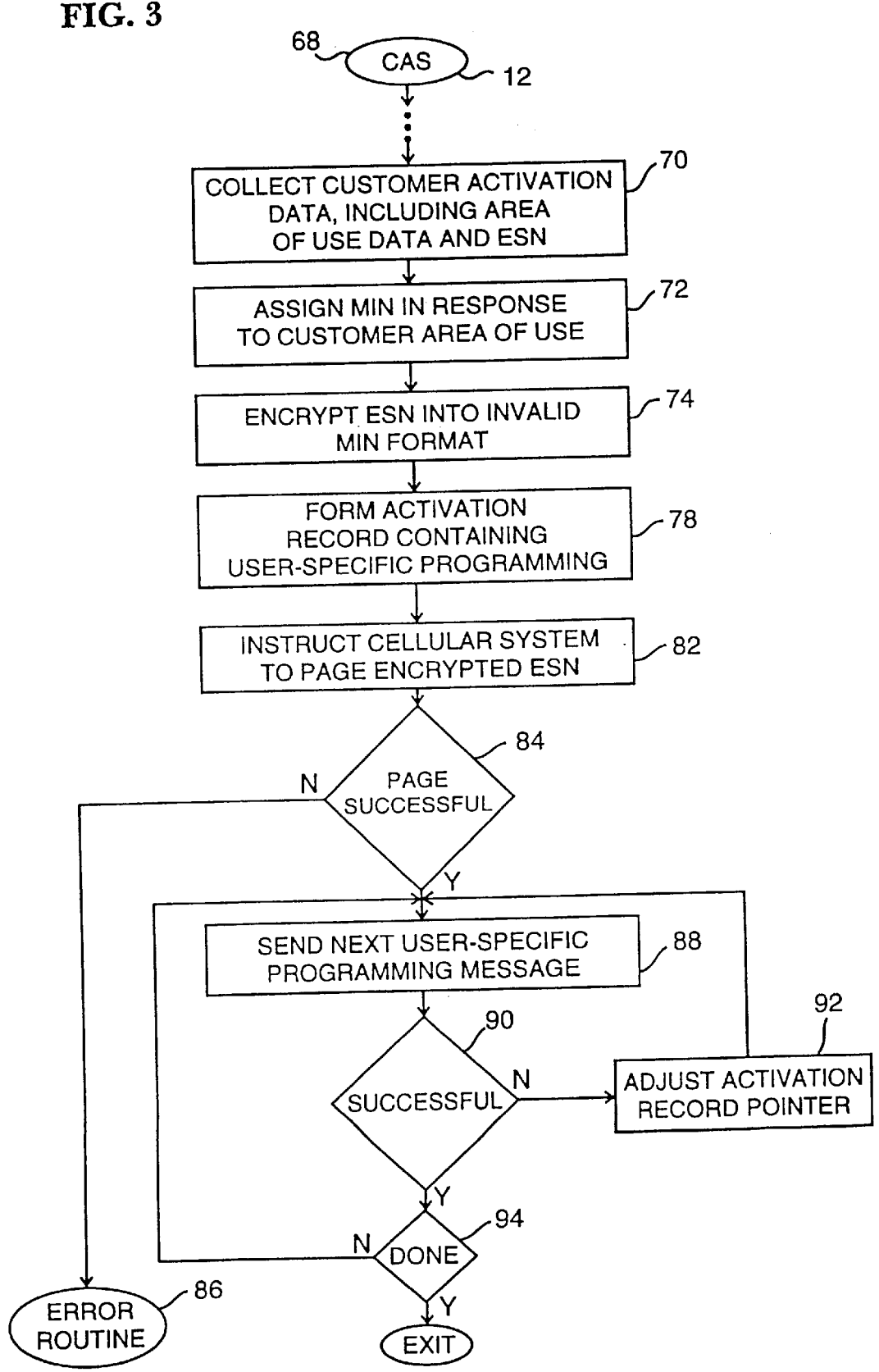
FIG. 3 shows a flow chart of a process performed by a customer activation system (CAS)

FIG. 3 shows a flow chart of a process 68 performed by customer activation system (CAS) 12. CAS process 68 is performed when user-specific programming needs to be remotely programmed into one or more mobile stations 28, such as may occur during activation. While FIG. 3 specifically illustrates program flow for an activation, a similar process may be followed for other remote programming sessions which may occur after activation. As indicated by ellipsis in FIG. 3, process 68 may perform many tasks which are not directly related to writing user-specific programming to mobile stations 28. Such tasks may include the capture and maintenance of customer identification and billing records.

Process 68 performs a task 70 to collect customer activation data. This activation data desirably include information describing the area where the mobile station 28 will most often be used, where the mobile station 28 is currently located, the mobile station's ESN, and other data. Task 70 may be performed with the cooperation of a service representative who is engaging in a voice telephone conversation with a customer who may be located at a sales kiosk 30 (see FIG. 1).

After task 70, a task 72 assigns a valid MIN to the mobile station 28 in response to the area of use identified above in task 70. This area of use may, but need not, include the location of sales kiosk 30. The assigned MIN represents a 10 digit phone number that is not currently in use elsewhere, and has an area code and office code consistent with the MTSO 24 (see FIG. 1) for this area of use. Next, a task 74 encrypts the mobile station's ESN into an invalid MIN format.

FIG. 4 shows a data format diagram of a three word page response message 76 sent by a mobile station 28 over a reverse control channel to a land station 26. Message 76 follows conventional cellular telephony standards. As FIG. 4 illustrates, the MIN is formatted as a 34-bit binary number having a first portion (MIN1) conveyed by a first word and a second portion (MIN2) conveyed by a second word. The ESN is a 32-bit binary number that is conveyed by a third word.

Referring back to FIG. 3, task 74 applies the mobile station's 32-bit ESN to an encryption algorithm which generates a 34-bit encrypted ESN-MIN, and the 34-bit ESN-MIN is formatted as though it were an invalid MIN. The use of an invalid MIN format guarantees that no activated mobile station 28 will accidentally recognize the encrypted ESN as its MIN. An invalid MIN may be obtained by, for example, forcing the first digit of the decimal form of the ESN-MIN to a value of zero. The particular encryption algorithm implemented at task 74 is not relevant to the present invention, and this algorithm may use conventional public or private key encrypting techniques. As discussed below in more detail, the ESN-MIN will be used in lieu of a MIN to page the mobile station 28. The use of encryption further enhances security by reducing the risk of third party meddling with mobile station programming.

After task 74, a task 78 forms an activation record containing all the user-specific programming to be written into the mobile station 28 in an upcoming remote programming session. Desirably, the activation record is made up of one or more words, where each word includes a parameter identity (PID) and parameter value (PVAL). The MIN assigned above in task 72 to mobile station 28 represents one of the parameters conveyed in a word, and the activation record may include any number of words. Various PID/PVAL words may also be coded to present instructions to mobile station 28 rather than raw parameter data. Such instructions may, for example, instruct mobile station 28 that the previous PID/PVAL word was the last word to be transferred in the remote programming session. In another example, a PID/PVAL word may be coded as a command to deactivate mobile station 28 and thereby undo the user-specific programming specified in a previous activation.

In addition, task 78 arranges the PID/PVAL words in accordance with a mobile station control message delivered using a control channel protocol 80. FIG. 5 shows a data stream protocol diagram of control channel protocol 80 for a message that conveys one word of data. Protocol 80 is a conventional user-inaccessible protocol used in cellular telephony for control channel digital data communication. It conveys one 40-bit word for each 463-bit message. As illustrated in FIG. 5, protocol 80 includes a 10-bit dotting sequence plus a busy/idle bit, followed by an 11-bit word sync pattern plus a busy/idle bit, followed by five interleaved repetitions of an "A" stream 40-bit word and a "B" stream 40-bit word, wherein a busy/idle bit is inserted for each 10 bits of the A and B stream words. Conventionally, the "A" stream is distinguished from the "B" stream by the least significant bit (LSB) of the MIN to which the streams are directed. Thus, task 78 may repeat the PID/PVAL words in the "A" or "B" stream per protocol 80 and the LSB of the ESN-MIN generated in task 74 (see FIG. 3), or task 78 may simply repeat each PID/PVAL word ten times in each message. Control channel protocol 80 is executed on an assigned voice channel so that user-specific programming may be quickly transferred using as few system resources as possible. The entire process of remotely activating a mobile station 28 should take only a few seconds once the customer activation information has been collected.

After task 78, a task 82 selects an appropriate MTSO 24 (see FIG. 1) based upon the current location of the mobile station 28 to be remotely programmed, establishes a data link to this MTSO 24, and instructs the MTSO and cellular system it controls to page the ESN-MIN number generated above in task 74. From the cellular system's perspective, the ESN-MIN is treated as a valid MIN, and a conventional paging process is performed. CAS process 68 performs a task 84 to determine whether the page is eventually successful. If not successful, program control passes to an error handling routine 86 so that an appropriate action may be taken. For the above described activation process, a customer is engaged in an ongoing conversation with a service representative, and the error routine 86 may simply inform the service representative of the problem. For other remote programming situations, the unsuccessful page may simply be logged for queuing again at a later time.

When the page is successful, a task 88 sends the next user-specific programming message from the activation record formed above in task 78 through trunk 20, PSTN 16, MTSO 24, and a land station 26 (see FIG. 1) to mobile station 28. After task 88, a query task 90 waits for either an acknowledgement (ACK) or no acknowledgment (NAK) response from mobile station 28. Based on the nature of the received response, if any, task 90 determines whether the prior message was successful. If it was not successful, a task 92 adjusts a pointer to the activation record formed in task 78 to repeat the last record, and program control loops back to task 88. Although not shown, this loop may include additional tasks to break the loop should an excessive number of unsuccessful attempts be made.

When task 90 determines that the last message was successfully delivered, a query task 94 determines whether the final message from the activation record has been delivered. So long as additional messages remain, program control loops back to task 88 to continue sending PID/PVAL word messages to mobile station 28. When finished, program control exits process 68 and mobile station 28 has been remotely activated.

Process 68 also may be used to remotely program mobile stations 28 which are currently activated. For post-activation remote programming, task 70 may gather the user-specific programming to be downloaded into the mobile station 28. Tasks 72 and 74 may substitute the mobile station's existing MIN for the encrypted ESN-MIN discussed above. After task 74 program flow proceeds as described above, and the mobile station 28 will be paged using its MIN. Process 68 may also be repetitively performed to remotely program entire populations of mobile stations 28. This situation may occur when a cellular system change takes place, such as assigning new area codes or central office codes to a cellular system. In this situation, an entire population of mobile stations 28 requires updated user-specific programming reflecting newly assigned MINs. Process 68 may be repeated for each mobile station 28. Task 70 obtains a new MIN, tasks 72 and 74 identify an old MIN, and program flow proceeds as described above, but is repeated for each mobile station 28 in the population.

Figure 6:
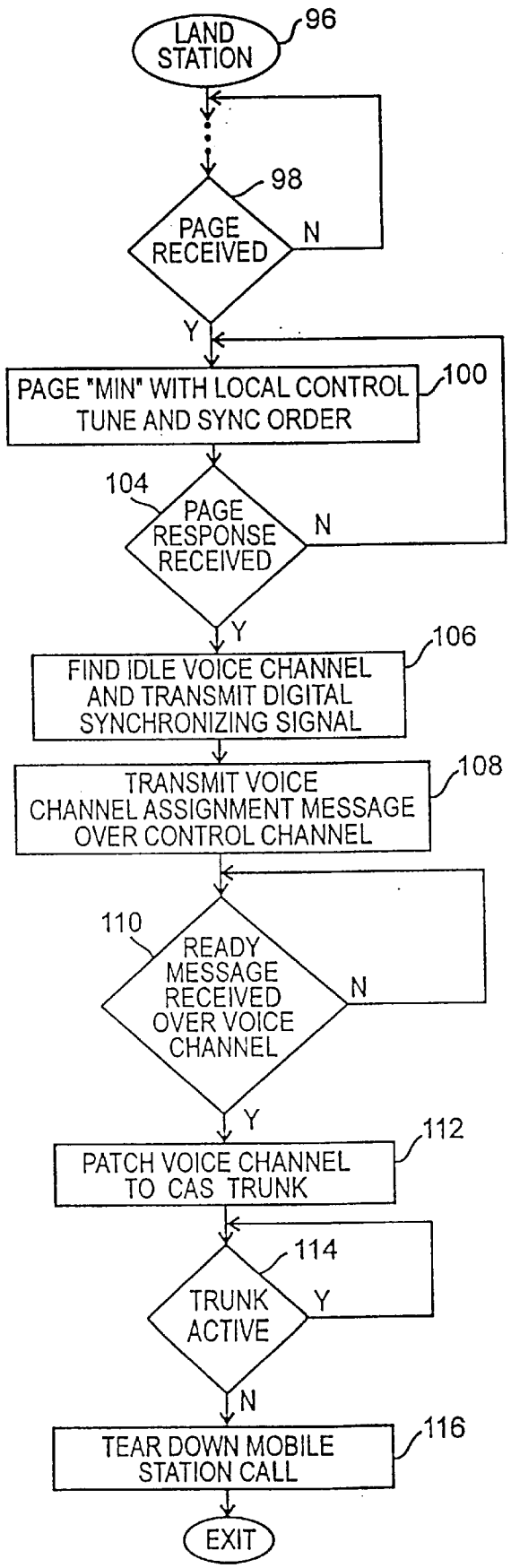
FIG. 6 shows a flow chart of a process performed by a land station.

FIG. 6 shows a flow chart of a process 96 performed by a land station 26. While process 96 is directed toward a single land station 26, those skilled in the art will appreciate that portions of it may be performed by the MTSO 24 which controls it and by other land stations 26 which are also controlled by that MTSO 24. As indicated by ellipsis in FIG. 6, process 96 includes many tasks related to managing channels that are allocated to land station 26 and are conventional in cellular telephony. A query task 98 is performed to signal when the land station 26 receives a page instruction from CAS 12 (see FIGS. 1 and 3). So long as no such instruction is received, land station 26 continues to perform conventional cellular land station processes.

Desirably, when the page instruction is received, all land stations in the cellular system controlled by MTSO 24 simultaneously receive the same instruction. At this point, a task 100 pages the "MIN" specified in the instruction with a local control order "tune and sync" message. As discussed above, it may be either a valid MIN or the ESN-MIN number discussed above in connection with task 74 (see FIG. 3). Land station 26 uses a conventional mobile station control message, such as message 102 shown in FIG. 7, and delivers message 102 while operating in its digital mode over a control channel using control channel protocol 80 (see FIG. 5).

Referring briefly to FIGS. 6 and 7, task 100 configures mobile station control message 102 as a local control order page message by inserting the MIN, which may be the ESN-MIN during an activation, in MIN1 and MIN2 fields of first and second words, by setting an appropriate value (11110) in the order field, and by setting the local field to a code that mobile station 28 will interpret as a tune and sync command.

Referring back to FIG. 6, after task 100 pages the MIN or ESN-MIN obtained from CAS 12, a query task 104 determines whether a page response message 76 (see FIG. 4) was received from the mobile station 28. As shown in FIG. 4, the page response message includes the MIN or ESN-MIN so that land station 26 can verify that it responded to the previous local control order page message. If no page response message is received, program control loops back to task 100. Although not shown, additional tasks may be included to break this loop after a certain number of repeated paging attempts have been tried or if an instruction to do so is received via MTSO 24.

When task 104 detects a page response message 76 (see FIG. 4) that responds to the tune and sync local control order page message transmitted above at task 100, a task 106 finds an idle voice channel, marks the channel busy so that it will not get assigned to other mobile stations 28, and transmits a digital synchronizing signal over the selected voice channel. Moreover, task 106 transmits the synchronizing signal on the voice channel using control channel protocol 80 (see FIG. 5). Task 106 may, for example, continuously transmit its overhead message over this voice channel. While task 106 causes land station 26 to operate one of its voice channels somewhat like a control channel, nothing requires any alteration in the manner in which land station 26 operates its control channel. In other words, control channel overhead and control channel messages continue to be transmitted from land station 26 over its control channel.

After task 106, a task 108 transmits a voice channel assignment message over its control channel using the conventional channel assignment protocol. Next, a query task 110 causes land station 26 to monitor the voice channel assigned above in task 106 for a ready message transmitted by mobile station 28. The ready message is sent to land station 26 using a reverse control channel protocol even though this is a voice channel. Program control stays at task 110 until this ready message is received. However, error handling tasks (not shown) may be included to address the situation where the mobile station 28 fails to respond with the ready message.

When task 110 detects the ready message, a task 112 is performed to patch the voice channel to trunk 20 (see FIG. 1) and to inform CAS 12 (see FIG. 1) that the page was successful. At this point, CAS 12 controls the data link to mobile station 28. Land station 26 exerts no further influence over the remote programming session. Rather, CAS 12 controls the remote programming session as discussed above in connection with FIG. 3. Land station 26 merely performs a query task 114 to determine when trunk 20 goes inactive. When trunk 20 is dropped, land station 26 performs a task 116 to tear down the call to mobile station 28. As a result of tearing down the call, the voice channel becomes idle again and may be used an needed to convey user information to and from mobile stations 28.

Figure 8:
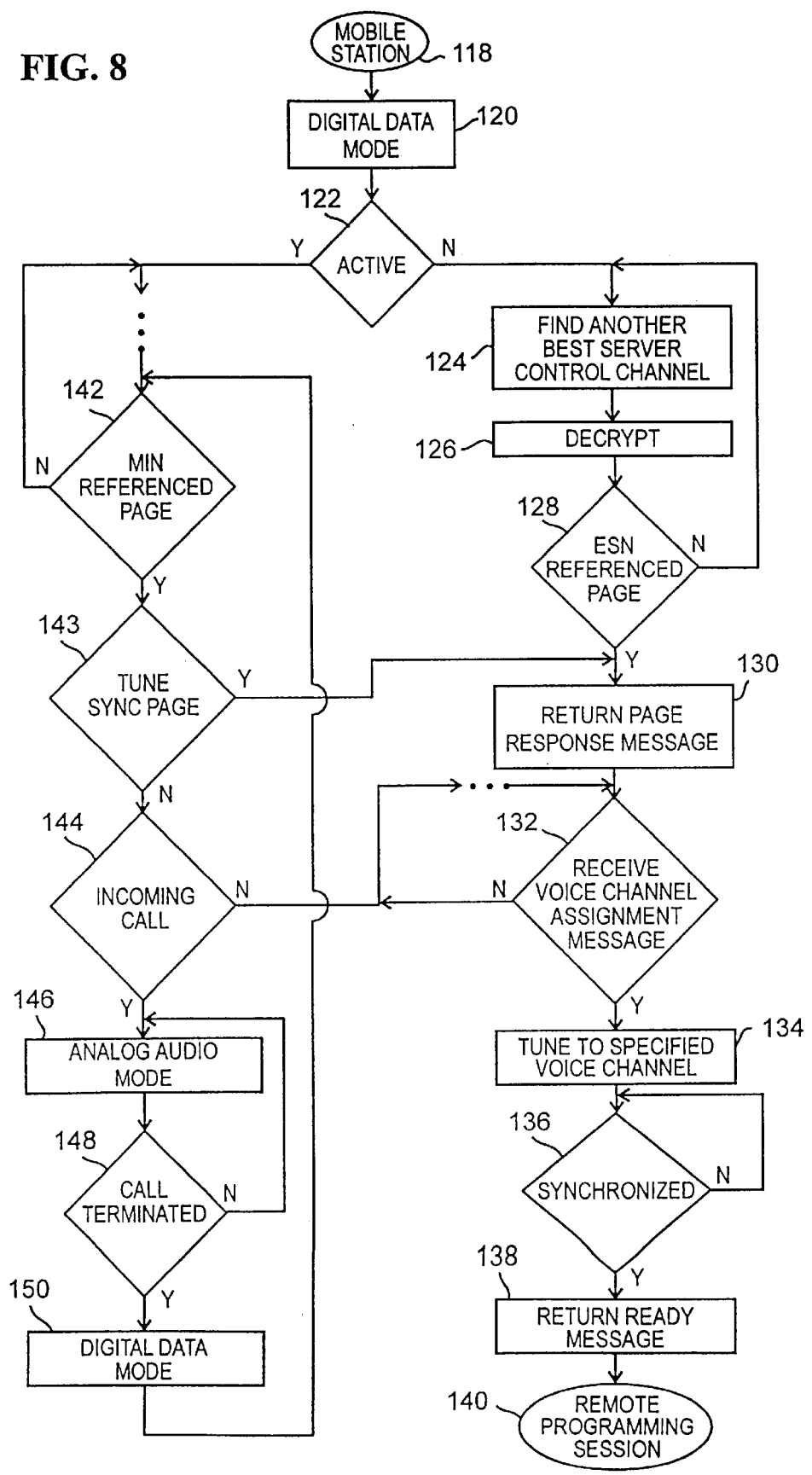
FIG. 8 shows a flow chart of a process performed by a mobile station.

FIG. 8 shows a flow chart of a process 118 performed by a mobile station 28. Process 118 may be performed when mobile station 28 powers up. Mobile station 28 performs various initialization tasks, including a task 120 which causes it to operate in its digital data mode. As discussed above in connection with FIG. 2, in this mode digital data, rather than analog audio signals, are routed through transmitter 36 and receiver 38. After task 120, a query task 122 determines whether mobile station 28 is active. Task 122 may, for example, determine whether its user-specific programming includes a valid MIN, but other evaluations can lead to the same conclusion. If mobile station 28 has not been activated, then it will operate in its inactive state, and program control proceeds to a task 124.

Task 124 scans control channels, the identities of which are programmed into mobile station 28, to select a best server control channel. Task 124 may monitor a received signal strength indicator (RSSI) when tuned to a control channel to determine whether any received signal exhibits sufficient strength.

After task 124, a task 126 performs a decryption operation which complements the encryption operation discussed above in connection with task 74 (see FIG. 3). The decryption operation may be performed in at least two different ways. The mobile station's ESN may be encrypted in a manner similar to that discussed above in connection with task 74 so that a resulting encrypted ESN-MIN is generated by task 126. This ESN-MIN may be compared with MINs conveyed from land stations 26 in page messages. Alternately, MINs may be parsed from received page messages and subjected to algorithms which complement the encryption algorithm performed by CAS 12 in task 74. This "decrypted" MIN may then be compared to the mobile station's ESN.

After task 126, a query task 128 determines whether a tune and sync local control order page message received from the control channel references the mobile station's ESN. Mobile station 28 may continue to monitor paging messages received over the selected control channel for a few seconds before task 128 decides that no page directed to its ESN has been received. When task 128 makes this determination, program control loops back to task 124 to select a different control channel and repeat the process of monitoring for a page message directed to the mobile station's ESN. In the preferred embodiment, the control channels selected at task 124 alternate between A and B cellular systems, and task 124 may select not only the control channels in each system with the strongest signals, but the control channels with the next strongest signals.

As discussed above, page messages directed to the mobile station may be simultaneously transmitted from all land stations 26 within a particular cellular system. Thus, a good chance exists that a page will be detected within a few tries. When task 128 detects an ESN referenced tune and sync local control order page message, a task 130 returns the appropriate page response message 76 (see FIG. 4) over the reverse control channel. The page response message echoes the ESN-MIN for the mobile station's MIN in the response message, and may include the mobile station's ESN.

After task 130, a query task 132 causes mobile station 28 to wait until the voice channel assignment message is received over the control channel. However, additional tasks may cause program control to exit task 132 if a voice channel assignment message is not forthcoming. In addition, additional tasks may evaluate received messages to determine if some other message or command directed to mobile station 28 is received. When the voice channel assignment message is detected, a task 134 is performed to tune transmitter 36 and receiver 38 (see FIG. 2) to the specified voice channel. After task 134, a query task 136 monitors the digital data signals and messages received over the voice channel until synchronization has been achieved. When mobile station 28 is synchronized to the digital data being transmitted over the voice channel, a task 138 returns the ready message to the land station 26 over the voice channel using a reverse control channel protocol which is normally used only on control channels.

After task 138, program control proceeds to a remote programming session 140, which is discussed in more detail below. During remote programming session 140 mobile station 28 continues to operate in its digital mode and its inactive state. Through remote programming session 140, user-specific programming will be communicated to mobile station 28 over the voice channel using control channel protocol 80 (see FIG. 5). Upon successful completion of a remote programming session 140, mobile station 28 may be activated and will thereafter operate in its active state. In its active state, mobile station 28 may operate in either its analog audio mode or its digital data mode.

Referring back to task 122, when mobile station 28 decides that it is active, it operates in its active state to perform numerous tasks, as indicated by ellipsis, which are conventional for cellular mobile stations. These tasks include monitoring control channels to detect incoming calls, tracking changes in channel availability, and monitoring keypad 56 (see FIG. 2) for user input. A query task 142 represents one such conventional mobile station task. Task 142 determines whether a MIN referenced page has been received at mobile station 28. In other words, task 142 determines whether a page message received at mobile station 28 conveys the MIN assigned to mobile station 28 through activation.

When task 142 detects a MIN referenced page, a query task 143 determines whether the page is a tune and sync local control order page message. The local control order page message differs from a page order in that the page order informs mobile station 28 of an incoming call and the tune and sync local control order page message informs mobile station 28 of an upcoming remote programming session. If task 143 detects a tune and sync local control order page message, program control proceeds to task 130 to return the page response message and proceed with tuning and synchronizing to a voice channel as discussed above.

If task 143 determines that the page message was not a tune and sync local control order page message, then a query task 144 determines whether an incoming user information call is indicated through a page order message. If a user information call is not indicated, then program control proceeds to task 132 to further process the page message to determine what sort of communication has been received. If a user information call is indicated, then mobile station 28 returns a page response message (not shown) and otherwise handles the call in a conventional manner.

In particular, a task 146 causes mobile station 28 to operate in its analog audio mode, and a query task 148 causes mobile station 28 to remain in its analog audio mode until the call terminates. When the call terminates, mobile station 28 reverts back to its digital data mode of operation, as indicated in a task 150, and program control loops back to the task 142.

Mobile station 28 switches to its analog audio mode when it receives an instruction to switch to a voice channel. When operating in the analog audio mode, both digital data and analog audio communications may take place. The analog audio communications convey the user information and account for the vast majority of communications which may take place. However, a small amount of signalling may also take place using digital data communications. Such signalling includes the communication of hand off messages. Digital data communications which occur over the voice channel follow a voice channel protocol 152, as shown in FIG. 9. Voice channel protocol 152 differs significantly from control channel protocol 80 (see FIG. 5). Since a continuous stream of data are not provided over the voice channel, mobile station 28 does not have the opportunity to become well synchronized. Thus, voice channel protocol 152 includes a 101-bit dotting pattern followed by eleven repeats of a single 40-bit word interleaved with 37-bit dotting sequences and 11-bit word sync patterns. Voice channel protocol 152 conveys one 40-bit word using 1069 bits. Thus, digital data communication using voice channel protocol 152 has a greatly reduced data throughput compared to control channel protocol 80. On the other hand, only a very small amount of digital data are conveyed using protocol 152.

Accordingly, when mobile station 28 operates in its active state, it communicates using both the analog audio mode and the digital data mode. A very small amount of digital signalling data may be communicated in the analog audio mode, but data throughput suffers due the use of voice channel protocol 152 which accommodates an inability to achieve thorough synchronization. While FIG. 8 illustrates the detection of only MIN referenced pages when mobile station 28 operates in its active state, those skilled in the art will appreciate that nothing prevents additional tasks from being inserted which might also detect ESN referenced pages along the lines of tasks 126 and 128.

Figure 10:
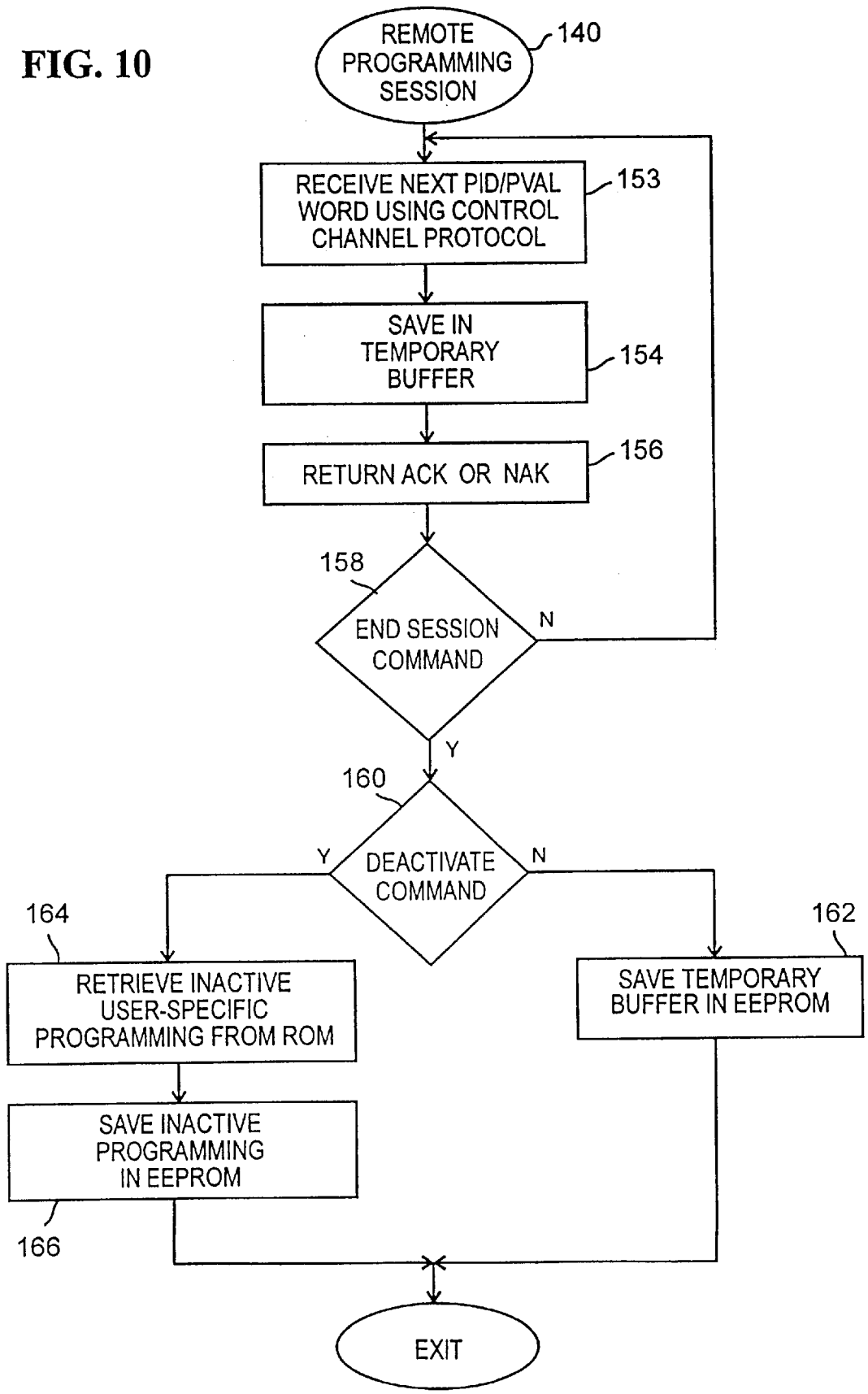
FIG. 10 shows a flow chart of a process performed by the mobile station during a remote programming session.

FIG. 10 shows a flow chart of remote programming session 140 performed by mobile station 28. Generally, remote programming session 140 responds to and complements the process performed by CAS 12 and discussed above in connection with FIG. 3. Substantially the same process is performed whether mobile station 28 receives a MIN referenced page or an ESN referenced page.

Remote programming session 140 performs a task 153 to receive a message which conveys a PID/PVAL word from CAS 12. The PID/PVAL word is received over a voice channel using control channel protocol 80 (see FIG. 5). As discussed above, the PID/PVAL word is repeated several times in the received message, and task 153 may vote on the most likely data configuration, verify parity, and perform other verifications which evaluate whether the parameter value (PVAL) is compatible with the specified parameter ID (PID). The received PID/PVAL word is stored in a temporary buffer in memory 60 by a task 154, and a task 156 then returns either an acknowledgment (ACK) or no acknowledgment (NAK) message to tell CAS 12 whether to repeat the message or go on to the next message.

After task 156, a query task 158 determines whether the last received user-specific programming message conveyed an end session command. So long as this command has not been received, program control loops back to task 153. However, additional tasks (not shown) may be included to break the loop should no messages be received for an excessive duration.

When task 158 detects the end session command, a query task 160 determines whether the PID/PVAL words received include a deactivation command. If no deactivation command has been received, a task 162 saves the temporarily stored parameter values (PVALs) to the appropriate locations in non-volatile read/write component 64 of memory 60 (see FIG. 2). As discussed above, during activation remote programming sessions, a valid MIN and other parameters are down loaded to mobile station 28 through the remote programming session. Thus, task 162 causes the valid MIN and other parameters to be saved in memory 60. After task 162, program control exits remote programming session 140, and may proceed back to mobile station process 118 (see FIG. 8), where mobile station 28 will then operate in its active state.

When task 160 detects a deactivation command, a task 164 retrieves default user-specific programming from read only component 66 of memory 60. This default user-specific programming includes an invalid MIN, a default keypad lock code, and other default values. It has the effect of preventing mobile station 28 from communicating user information and forcing mobile station 28 to operate in its inactive state. After task 164, a task 166 saves this inactive user-specific programming in non-volatile read/write component 64 of memory 60, thereby overwriting any active user-specific programming which may have been previously stored there. After task 166, program control exits remote programming session 140 and may proceed back to mobile station process 118 (see FIG. 8), where mobile station 28 will then operate in its inactive state.

The inclusion of an inactive command, when coupled with the security precautions provided by the present invention, is advantageous for organizations which rent or loan mobile stations 28. The deactivation command helps such organizations maintain tight control over their mobile stations 28 by rendering the mobile stations 28 unusable when users are not complying with rental or loan arrangements.

While the remote programming session 140 discussed herein is configured to illustrate the writing of user-specific programming to mobile stations 28, nothing prevents remote programming session 140 from additionally being configured to read or audit data stored in mobile stations 28.

In summary, the present invention provides an improved cellular system having remotely programmable mobile stations. The mobile stations may be remotely programmed for user-specific activation programming and for subsequent alterations in the user-specific programming. The present invention provides remote programming without requiring the use of ubiquitous conventional telecommunications modem technology and without suffering the security risks associated therewith. In addition, the secure remote programming of certain mobile stations is achieved without significant changes to the existing cellular telecommunications infrastructure. Consequently, it may be successfully implemented at minimal expense.

The present invention has been described above with reference to preferred embodiments. However, those skilled in the art will recognize that changes and modifications may be made in these preferred embodiments without departing from the scope of the present invention. For example, while the present invention is described herein in connection with a particular cellular system, the present invention may also be used in connection with a wide variety of cellular systems and other radio telecommunication systems. Furthermore, while the present invention has been described in connection with a specific programming flow, those skilled in the art will appreciate that a large amount of variation in configuring process tasks and in sequencing process tasks may be directed to accomplishing substantially the same functions as are described herein. These and other changes and modifications which are obvious to those skilled in the art are intended to be included within the scope of the present invention.

What is claimed is:

1. A cellular telephone configured for remote activation, the cellular telephone comprising:
    an antenna;
    a transmitter coupled to said antenna;
    a receiver coupled to said antenna, said receiver being used to conduct telephone calls;
    a controller coupled to said transmitter and to said receiver; and
    a memory coupled to said controller;
wherein said controller is configured to detect a page message received at said receiver and referencing a location-independent identifying code stored in said memory.

2. The cellular telephone of claim 1, wherein said location-independent identifying code is derived from an electronic serial number (ESN) assigned to said cellular telephone.

3. The cellular telephone of claim 1, wherein said controller is further configured to enter a remote programming mode after detecting said page message.

4. The cellular telephone of claim 3, wherein after entering said remote programming mode, said controller is configured to accept digital data received by said cellular telephone and to store said digital data in said memory.

5. The cellular telephone of claim 4, wherein said digital data comprises a home system identification number (SID) for said cellular telephone.

6. The cellular telephone of claim 4, wherein said digital data comprises a system identification number (SID).

7. The cellular telephone of claim 4, wherein said digital data comprises a mobile identification number (MIN) for said cellular telephone.

8. The cellular telephone of claim 4, wherein said digital data comprises an executable instruction.

9. A cellular telephone configured for remote activation, the cellular telephone comprising:
    an antenna;
    a transmitter coupled to said antenna;
    a receiver coupled to said antenna;
    a controller coupled to said transmitter and to said receiver; and
    a memory coupled to said controller;
wherein said controller is configured to detect a page message received over a cellular network, said page message referencing a location-independent identifying code stored in said memory.

10. The cellular telephone of claim 9, wherein said location-independent identifying code is derived from an electronic serial number (ESN) assigned to said cellular telephone.

11. The cellular telephone of claim 9, wherein said controller is further configured to enter a remote programming mode after detecting said page message.

12. The cellular telephone of claim 11, wherein after entering said remote programming mode, said controller is configured to accept digital data received by said cellular telephone and to store said digital data in said memory.

13. The cellular telephone of claim 11, wherein said digital data comprises a home system identification number (SID) for said cellular telephone.

14. The cellular telephone of claim 11, wherein said digital data comprises a system identification number (SID).

15. The cellular telephone of claim 11, wherein said digital data comprises a mobile identification number (MIN) for said cellular telephone.

16. The cellular telephone of claim 11, wherein said digital data comprises an executable instruction.

17. A cellular telephone comprising:
    an antenna;
    a transmitter configured to conduct telephone calls, said transmitter being coupled to said antenna;
    a receiver configured to conduct telephone calls, said receiver being coupled to said antenna and said antenna, said transmitter, and said receiver forming an air interface for said cellular telephone;
    a controller coupled to said air interface; and
    a memory coupled to said controller;
wherein said controller is configured to detect a page message received through said receiver by said air interface, said page message referencing a location-independent identifying code stored in said memory.

18. The cellular telephone of claim 17, wherein said location-independent identifying code is derived from an electronic serial number (ESN) of said cellular telephone.

19. The cellular telephone of claim 18, wherein after detecting said page message, said controller is further configured to receive remote programming information received by said air interface.

20. The cellular telephone of claim 19, wherein said remote programming information comprises a mobile identification number (MIN).

21. The cellular telephone of claim 20, wherein said controller is configured to store said received mobile identification number (MIN) in said memory.

22. A cellular telephone comprising:
    an antenna;
    a transmitter coupled to said antenna;
    a receiver coupled to said antenna, so that said antenna, said transmitter, and said receiver form an air interface for said cellular telephone;
    a controller coupled to said air interface; and
    a memory coupled to said controller;
wherein said controller is configured to detect a page message received from a cellular network by said air interface, said page message referencing a location-independent identifying code stored in said memory.

23. The cellular telephone of claim 22, wherein said location-independent identifying code is derived from an electronic serial number (ESN) of said cellular telephone.

24. The cellular telephone of claim 23, wherein after detecting said page message, said controller is further configured to receive remote programming information received by said air interface.

25. The cellular telephone of claim 24, wherein said remote programming information comprises a mobile identification number (MIN).

26. The cellular telephone of claim 25, wherein said controller is configured to store said received mobile identification number (MIN) in said memory.

27. A cellular telephone configured for network initiated activation, said cellular telephone comprising:
    an antenna;
    a transmitter coupled to said antenna;
    a receiver coupled to said antenna;
    a controller coupled to said transmitter and to said receiver; and a memory coupled to said controller, said memory containing an electronic serial number (ESN) assigned to said cellular telephone but not containing a mobile identification number (MIN) assigned to said cellular telephone;

wherein said controller is configured to detect a page message that references data derived from said electronic serial number (ESN) and to enter a remote programming mode after detecting said page message.

28. The cellular telephone of claim 27, wherein said controller is configured to accept digital data received by said cellular telephone while said controller is in said remote programming mode.

29. The cellular telephone of claim 28, wherein said digital data comprises a mobile identification number (MIN) for said cellular telephone.

30. The cellular telephone of claim 28, wherein said digital data comprises a home system identification number (SID) for said cellular telephone.

31. The cellular telephone of claim 28, wherein said digital data comprises a system identification number (SID) other than a home SID for said cellular telephone.

32. The cellular telephone of claim 28, wherein said digital data comprises an executable instruction.

33. The cellular telephone of claim 27, wherein said page message is directed to an ESN-MIN number derived from said electronic serial number (ESN).

34. A cellular telephone configured for network initiated activation, said cellular telephone comprising:

an antenna;

a transmitter coupled to said antenna;

a receiver coupled to said antenna;

a memory containing a location-independent identifying code; and first means for detecting a page message which references said location-independent identifying code.

35. The cellular telephone of claim 34, further comprising:

second means for entering a remote programming mode after said first means has detected said page message.

36. The cellular telephone of claim 35, wherein said cellular telephone is configured to receive digital data while in said remote programming mode and to store said digital data in said memory.

37. The cellular telephone of claim 36, wherein said digital data comprises a mobile identification number (MIN).

38. The cellular telephone of claim 36, wherein said digital data comprises a system identification number (SID).

39. The cellular telephone of claim 36, wherein said digital data comprises an executable instruction.

40. A cellular telephone configured for remote reprogramming, said cellular telephone comprising:

an antenna;

a receiver coupled to said antenna;

a transmitter coupled to said antenna;

a controller coupled to said transmitter and to said receiver; and a memory coupled to said controller, said memory containing an electronic serial number (ESN) and a first valid mobile identification number (MIN) for said cellular telephone;

wherein said controller is configured to accept digital data received over a cellular network by said receiver operating in a digital data mode and to store said digital data in said memory.

41. The cellular telephone of claim 40, wherein said receiver is configured to receive said digital data formatted according to a control channel protocol.

42. The cellular telephone of claim 41, wherein said digital data comprises a second mobile identification number (MIN), said second MIN being different than said first MIN.

43. The cellular telephone of claim 41, wherein said digital data comprises a system identification number (SID).

44. The cellular telephone of claim 41, wherein said digital data comprises an executable instruction.

45. The cellular telephone of claim 41, wherein said digital data comprises data that deactivates said cellular telephone.

46. The cellular telephone of claim 41, wherein said digital data comprises a deactivation command.

47. The cellular telephone of claim 40, wherein said digital data is conveyed to said cellular telephone through a remote programming session initiated by said cellular network.

48. A cellular telephone configured for network initiated remote programming, said cellular telephone comprising:

an antenna;

a transmitter coupled to said antenna;

a receiver coupled to said antenna, said receiver being used to conduct telephone calls;

a controller coupled to said transmitter and to said receiver; and a memory coupled to said controller;

wherein said controller is configured to detect a digital message received by said receiver and to enter a remote programming mode after detecting said digital message.

49. The cellular telephone of claim 48, wherein said digital message is formatted according to a control channel protocol.

50. The cellular telephone of claim 49, wherein said controller is further configured to accept digital programming data received by said receiver while in said remote programming mode and to store said digital programming data in said memory.

51. The cellular telephone of claim 50, wherein said digital programming data comprises a system identification number (SID).

52. The cellular telephone of claim 50, wherein said digital programming data comprises a mobile identification number (MIN).

53. The cellular telephone of claim 50, wherein said digital programming data comprises an executable instruction.

54. The cellular telephone of claim 48, wherein said digital message is initiated by said network.

55. A cellular telephone configured for network initiated remote programming, said cellular telephone comprising:

an antenna;

a transmitter coupled to said antenna;

a receiver coupled to said antenna;

a memory containing an electronic serial number (ESN) and a first mobile identification number (MIN);

first means for detecting a digital message received by said receiver; and second means for entering a remote programming mode wherein said cellular telephone receives digital data formatted according to a control channel protocol, said second means entering said remote programming mode after said first means detects said digital message.

56. The cellular telephone of claim 55, wherein said digital data comprises a second mobile identification number (MIN).

57. The cellular telephone of claim 55, wherein said digital data comprises a system identification number (SID).

58. The cellular telephone of claim 55, wherein said digital data comprises an executable instruction.

59. The cellular telephone of claim 55, wherein said digital data comprises data that deactivates said cellular telephone.

60. The cellular telephone of claim 55, wherein said data comprises a deactivation command.

* * * * *